March 22, 1960 K. N. MATHES ET AL 2,929,744
IRRADIATED POLYETHYLENE AND PRODUCTS THEREFROM
Filed Nov. 3, 1954
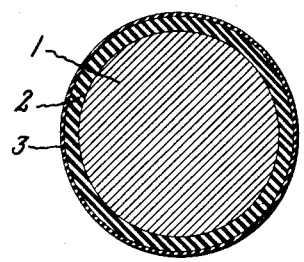
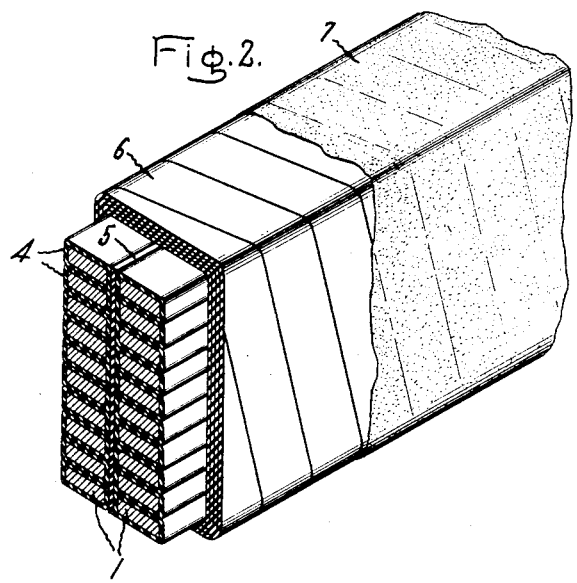
Inventors:
Kenneth N. Mathes
Harry I. Morgan
by
Their Attorney United States Patent Office 2,929,744
Patented Mar. 22, 1960

2,929,744

IRRADIATED POLYETHYLENE AND PRODUCTS THEREFROM

Kenneth N. Mathes and Harry I. Morgan, Schenectady, N.Y., assignors to General Electric Company, a corporation of New York Application November 3, 1954, Serial No. 466,546

15 Claims. (Cl. 117—218)

This invention is concerned with the treatment of irradiated polyethylene in order to improve its stability at elevated temperatures. More particularly, the invention relates to the treatment of irradiated polyethylene to improve its resistance to deterioration in air at elevated temperatures of the order of about 125° to 175° C., which process comprises coating the irradiated polyethylene with a composition comprising a hardenable varnish having a low rate of air permeation, and having good adhesion to the irradiated polyethylene surface.

In the copending application of Elliott J. Lawton and Arthur M. Bueche, Serial No. 324,552, filed December 6, 1952, and assigned to the same assignee as the present invention, there is disclosed and claimed the treatment of solid polyethylene with high energy electrons to effect cross linking of the polyethylene and to yield a product which has improved resistance to solvents as evidenced by its reduced solubility in many solvents, and improved resistance to heat at elevated temperatures of the order of about 125° to 175° C. or even higher. The polyethylene irradiated with high energy electrons as described in the above-mentioned Lawton and Bueche application retains its form and shows no evidence of flow at temperatures of around 125° to 175° C. in contrast to the unirradiated polyethylene which readily flows and melts at temperatures around 110° C., the softening temperature of continuous operation being around 75 to 90° C. Many applications using the irradiated polyethylene involve maintaining the irradiated polyethylene continuously for very long periods of time at temperatures materially above those for which unirradiated polyethylene is rated. However, unexpectedly it has been found that at these elevated temperatures there tends to occur a degradation of the irradiated polyethylene as evidenced by the fact that the surface of the irradiated polyethylene becomes pitted and exhibits excessive flow.

An additional difficulty encountered with irradiated polyethylene occurs when the latter is used to insulate electrical conductors, particularly copper conductors, either by wrapping irradiated polyethylene tape around the conductor or else extruding unirradiated polyethylene over the conductor and thereafter irradiating the insulated conductor. In making such insulated conductors, another method comprises irradiating the polyethylene at a sufficient dose level, milling the irradiated polyethylene, and thereafter extruding it over the conductor in the manner disclosed and claimed in the copending application of Quintin P. Cole, Serial No. 437,477, filed June 17, 1954, and assigned to the same assignee as the present invention. It has been found that when irradiated polyethylene is permitted to remain in contact with copper at elevated temperatures of about 125 to 175° C. or higher for lengths of time of the order of about 25 to 50 hours or more, a reaction appears to occur with the copper causing "greening" which takes the form of a green film on the surface of the copper. The appearance of this green film reduces the adhesion of the polyethylene to the copper core and undesirably affects the electrical properties of the conductor while at the same time undesirably causing degradation of the irradiated polyethylene especially at elevated temperatures. Even if one incorporates oxidation inhibitors or stabilizers in the polyethylene usually employed in the art, although resulting in some improvement in the resistance to oxidation, nevertheless there will still occur undesirable weight losses at elevated temperatures. Although this rate of oxidation or degradation can be slowed down more by incorporating larger amounts of the stabilizer, nevertheless such large amounts of stabilizer are unsatisfactory when used in irradiated polyethylene employed for insulating purposes because of undesirable effects on the electrical properties of the insulating conductor.

We have now discovered that we are able to render irradiated polyethylene extremely resistant to oxidation and degradation at elevated temperatures of the order of about 150° to 175° C. for long periods of time. In addition, we have discovered a method whereby conductors insulated with irradiated polyethylene can be maintained at the above-mentioned elevated temperatures for long periods of time without any evidence of greening occurring at the interface between the conductor and the irradiated polyethylene insulation. In accordance with our invention, we apply to the surface of irradiated polyethylene a resinous coating which is capable of protecting the former from the effects of the oxygen on the polyethylene surface, while at the same time maintaining good adhesion between the resinous coating and the irradiated polyethylene surface.

The accompanying drawing with its two figures shows two embodiments in which the presently claimed invention may be employed. Fig. 1, which is a cross-sectional view, shows an insulated electrical conductor comprising a metallic core 1 (such as copper, aluminum, etc.), insulation 2 for said core comprising irradiated polyethylene, and an outer resinous coating 3 in intimate contact with the outer irradiated polyethylene surface.

Fig. 2 is a perspective cross-sectional view of an electrical machine winding composed of a plurality of metallic conductor cores 1 insulated from each other by a turn insulation 4 which may be irradiated polyethylene if desired, or any other suitable insulation, preferably a heat-resistant insulation, a bond strip 5 separating the nest of insulated conductors (which bond strip may also be irradiated polyethylene or laminates of polyethylene with other material), and a wrap-around 6 of irradiated polyethylene in the form of a plurality of lapped layers of the irradiated polyethylene to which is firmly adhered a cured, continuous, resinous coating 7 employed to protect the irradiated polyethylene from the effects of air at elevated temperatures.

The selection of the varnish used in the practice of the present invention is believed to depend on certain requirements. The varnish should be tough and flexible, and resistant to cracking in the cured or hardened state when applied to the irradiated polyethylene surface, and should have good adhesion to the irradiated polyethylene surface. It was surprising and in no way could have been expected that the use of the varnish treatment on the irradiated polyethylene would produce the results described herein because using many of the same varnishes herein employed on unirradiated polyethylene, difficulty was encountered in obtaining continuous, uniform films which would adequately wet the surface of the polyethylene. Unexpectedly, it was found that after irradiation of the polyethylene with high energy electrons, all difficulties in this respect disappeared and these very same varnishes, when used to coat the irradiated polyethylene, formed uniform, continuous films on the surface of the latter and appeared to wet the irradiated polyethylene surface at every point with which the varnish came in contact.

Varnishes found to be especially suitable in the practice of the present invention comprise generally phenolic varnishes made from a phenol and an aldehyde, modified phenolic varnishes, for instance, those modified with oils, with alkylated phenols, with rosin or its derivatives, etc., as well as oil-modified reaction products of polyhydric alcohol-polybasic acid reaction products (commonly identified as "oil-modified alkyd resins"), rosin-modified alkyd resins, phenolic-modified alkyd resins, etc. The varnishes used may be in a sufficiently low molecular weight form that they do not require solvent to maintain a liquid condition, or they may be varnishes dissolved in suitable solvents, for instance, petroleum spirits, xylene, liquid aliphatic hydrocarbons, butanol, aliphatic acylates, for instance, amyl acetate, etc.

Among the varnishes which may be employed for the above-identified purposes are, for example, phenol-aldehyde varnishes (for example, condensation products of phenol and formaldehyde, phenol and acetaldehyde, etc.), modified phenolaldehyde reaction products, as, for instance, those modified with alkylated phenols, for example, those modified with cresols, tertiary butyl phenol-modified phenol-aldehyde resinous materials; phenol-aldehyde modified polyvinylal resins; ethoxyline resins; oil-modified phenol-aldehyde resinous, for instance, oil-modified para-tertiary amyl phenol-aldehyde resins, rosin-modified phenolic condensation products, etc.; modified alkyd resins in which the alkyds are resinous condensation products resulting from the reaction of one or more polyhydric alcohols with a polycarboxylic acid (or anhydride), with one or more of the following modifying ingredients, for instance, rosin; modifying oils, e.g., non-drying oils, semi-drying oils, drying oils, fatty oils, fatty oil acids, etc., derived either from vegetable or animal sources or produced synthetically, etc.; esters, specifically glycerides of fatty acids, etc.; and mixtures of one or more of these modifying ingredients with natural resins, as well as other equivalent products.

Examples of polycarboxylic acids (or anhydrides) used in the manufacture of the aforesaid alkyd resins are oxalic, malonic, succinic, adipic, azelaic, phthalic, halogenated phthalic acids, for example, tetrachlorophthalic acid or anhydride, 4-chlorophthalic acid, isophthalic acid, terephthalic acid, adducts of hexachlorocyclopentadiene and maleic anhydride, etc. Examples of polyhydric alcohols (dihydric, trihydric, etc.) which may be used in formulating the varnishes employed in the practice of this invention are ethylene glycol, diethylene glycol, propylene glycol, glycerine, sorbitol, pentaerythrital, etc. Monohydric acohols, for example, those boiling above 150° C., such as alkyl ethers of glycols, for instance, alkyl ethers of ethylene and diethylene glycol, etc., may also be used for modification purposes.

The modifying ingredients may comprise modifying oils in the raw, heated or blown state which may be employed in making the modified alkyd resins, for example, linseed oil, China-wood oil, castor oil, soya bean oil, oiticica oil, linseed oil acids, coconut oil acids, palmitic acids, stearic acid, oleic acid, etc. The amount of the modifying ingredients may be varied within wide limits, for example, from 5 to 70 percent, preferably from 10 to 60 percent, by weight, of the total weight of the modifying ingredient, the polyhydric alcohol and the polybasic acid or acids (or anhydride if used) present in the reaction mixture. Techniques for making these above-mentioned varnishes are well known in the art and can be readily determined from the prior work which has been published in connection with varnish preparation by many workers in this field. The presence of pigments or dyes in the varnish coating is not precluded.

The above-described varnishes, particularly the phenolic varnishes and the oil-modified alkyd varnishes, may be further modified with amido-aldehyde resins, for instance, melamine-formaldehyde resins, urea-aldehyde resins, and modified amido-aldehyde resins, as, for instance, the above-mentioned melamine-formaldehyde resins modified with butyl alcohol, ethyl alcohol, etc. Such modified resinous compositions are also widely used in the coating art and the preparation of these materials is readily apparent from an examination of the prior art.

The varnish applied to the irradiated polyethylene surface is preferably in a dilute concentration and advantageously has a solids content of about 10 to 60 percent for ease of application. The manner of application of the varnish to the irradiated polyethylene surface may be varied widely. Thus, one may employ dipping techniques, that is, dipping the irradiated polyethylene article or surface in the liquid varnish or varnish solution, by spraying, by brushing the varnish on the irradiated polyethylene article, etc. The thickness of the resinous coating should range from about 0.0005 up to a thickness where flexibility of the film is impaired after continued exposure to elevated temperatures. Such upper thicknesses are advantageously about 0.01 inch, although thicker coatings may be employed in certain applications using irradiated polyethylene. After application of the varnish to the irradiated polyethylene surface, the treated polyethylene may then be advantageously heated at temperatures of about 100° to 125° C. for times varying from about 15 minutes to an hour to effect cure and drying of the varnished surface. Acceleration of this curing may be effected by raising the temperature to about 150° to 175° C. Additional acceleration in the drying of the outer varnish coating may be obtained by incorporating cure accelerators in the varnish prior to application to the irradiated polyethylene surface. Among such cure accelerators may be mentioned various dryers including metallic salts of long-chain fatty acids, for instance, iron octoate, tin oleate, manganese octoate, etc., as well as various other metallic salts, such as lead naphthenate, iron naphthenate, manganese naphthenate, etc. The amount required for these cure accelerators to exert the desired action is relatively small and usually is below 0.5 percent based on the weight of the resinous coating material.

The polyethylene referred to herein is a solid polymeric material formed by the polymerization of ethylene at high temperatures and pressures. It may range in molecular weight from about 10,000 to as high as 30,000 or more. Examples of commercially available polyethylene which can be employed in the practice of the instant invention are polyethylene DYNH sold by the Bakelite Corporation, Bound Brook, New Jersey; Du Pont polyethylene resins sold under the trade name of "Alathan," its properties, uses, etc, being set forth in Du Pont Information Bulletin A–3584, published by the Du Pont Polychemicals Department; Marlex polyethylene manufactured and sold by Phillips Petroleum Company, etc.

The accelerator apparatus used to irradiate the polyethylene with high energy electrons so as to cross-link it is more particularly described in the above-mentioned Lawton and Bueche application and employs a high voltage accelerating apparatus capable of producing a beam of high energy electrons. This high voltage accelerating apparatus may be of the type disclosed in U.S. Patent 2,144,518—Westendorp as well as the apparatus described in Electronics, volume 16, pages 128–133 (1944).

The irradiated polyethylene employed herein may have been subjected to various irradiation doses, for instance, of the order of from about $2 \times 10^6$ R. to as high as 15 to 20 or more $\times 10^6$ R. In general, the irradiation dose will depend upon such factors as the application involved, the type of polyethylene used (its molecular weight, method of preparation, etc.), whether it is to be subsequently milled and molded in a manner described in the aforementioned Cole application Serial No. 437,477, etc. If the polyethylene is irradiated beforehand in the form of sheets, tapes, etc., and thereafter applied, for instance, as insulation for conductors, it is possible to use higher irradiation doses than if it is to be irradiated, milled and then extruded, for instance, over electrical conductor. In addition, polyethylene-fabricated articles, for instance, containers, gaskets, etc. may be irradiated at higher irradiation doses since the irradiated article will not be subjected to any further physical deformation either before or after treatment with the varnish coating. Accordingly, it is readily apparent that the irradiation dose that the polyethylene will be subjected to is not critical in the practice of our invention. The incorporation of fillers, either before irradiation or after irradiation, and before milling or during milling (as disclosed in the above-mentioned Cole application), is not precluded. Among such fillers may be mentioned various finely divided silica fillers, such as silica aerogel, fume silicas, carbon black, etc.

The polyethylene which is subjected to irradiation may be in any physical state or size. Thus, if it is in a finely divided state and is later to be subjected to a milling action and molded, for instance, extruded, etc., it may be in the form of finely divided particles which can readily assimilate the high energy electrons. On the other hand, the polyethylene during the irradiation operation may be in the form of a formed article such as a bottle, a gasket, etc., or it may be in the form of polyethylene insulated conductors which are then subjected to irradiation with high energy electrons, electrical equipment containing irradiated polyethylene in its insulation system, e.g., slot liners in motors, taped coils in motors and generators, layer insulation in coils and transformers, protective tapings, etc. In connection with insulated conductors containing irradiated polyethylene as insulation, it is to be understood that these insulated conductors may be used in various applications including the manufacture of windings for motors, generators, transformers, etc., which can be thereafter coated either as individual conductor strands or as a total equipment with the above-described varnishes.

In order that those skilled in the art may better understand how the present invention may be practiced, the following examples are given by way of illustration and not by way of limitation. All parts are by weight.

EXAMPLE 1

A sheet of polyethylene (Bakelite DYNH) about 0.1" thick was irradiated with high energy electrons to a dose level of $15 \times 10^6$ R. (R.=Roentgen units, more particularly described in the aforementioned Lawton and Bueche application). A square of this irradiated sample was coated by dipping it in a varnish solution comprising a rosin and linseed oil-modified glyceryl-phthalate varnish which was further modified with a resinous composition composed of a reaction product of formaldehyde and p-tertiary butyl phenol. Treatment of the irradiated polyethylene sample was carried out by dipping the entire sample in the varnish (which was at about a 50% solids concentration and contained about 0.1 percent of a drier, specifically lead and cobalt naphthenates) and thereafter baking the sample at about 125° C. for about 1¾ hours to cure the varnish. Thereafter, this sample, together with an uncoated sample of similar thickness of the above irradiated polyethylene, was placed in a 150° C. air circulating oven and the weight of the sample noted at various intervals after having first recorded the weight of the sample prior to insertion in the oven. At the end of 50 hours at 150° C., the weight of the uncoated irradiated polyethylene sample began to drop sharply and the sample showed visual signs of degradation as evidenced by surface pitting and melting at the edges. When removed from the oven after 50 hours at 150° C., the sample was losing weight at the rate of 25 percent of its original weight per 1000 hours at the 150° C. temperature. In contrast to this, the sample coated with the above-mentioned oil-modified, rosin-modified, phenolic-modified glyceryl phthalate resin after 5500 hours showed no evidence of surface pitting, or melting at the edges, or stagging, and was losing weight at the rate of only 0.5 percent of the original weight per 1000 hours.

EXAMPLE 2

In this example, copper wire, about ¼" in diameter was wound with a polyethylene tape 0.005" x 1" (molecular weight about 21,000) which had been irradiated to a dose of $7.5 \times 10^6$ R. One layer half-lapped, of this irradiated tape was wound on the conductor. Another taped conductor was prepared exactly as above, but in addition the taped conductor was dipped in a rosin-modified, linseed oil-modified, glyceryl-phthalate varnish similar to that employed in Example 1, with the exception that it was not further modified with the phenol resin. This varnish also contained the driers described in Example 1. The coated, insulated conductor was kept at room temperature for about 12 hours to evaporate the solvent, and to effect room-temperature cure of the outer resinous coating. The treated, insulated conductor and an untreated insulated conductor were placed in a 100° C. air-circulating oven and the condition of the insulation in direct contact with the copper core was noted in each instance. After 72 hours, the insulated conductor which had not been coated on the outside with the glyceryl phthalate resin solution showed "green" spots in the insulation, and the insulation had become weak and cheesy. In addition, the copper surface showed signs of corrosion as evidenced by greenish spots and roughening. In contrast to this, the taped conductor which had been coated with the varnish showed no apparent sign of copper corrosion or discoloration of the polyethylene insulation even after 500 hours at 100° C.; the strength of the insulating tape had not deteriorated to any noticeable extent. Another taped conductor prepared similar to the above and coated with the same varnish described in the instant example was placed in a 150° C. air-circulating oven. At the end of 500 hours, the polyethylene insulation was colorless and its strength appeared to be unchanged despite the drastic conditions to which the insulated conductor had been subjected.

EXAMPLE 3

Polyethylene tape, 1" wide and 0.005" thick was treated with high energy electrons to a dose of $7.5 \times 10^6$ R. This tape was wound around a ¼" diameter copper wire to give a total polyethylene thickness of 0.060". Another similarly insulated copper wire was dipped in the glyceryl phthalate varnish in Example 2 above, and maintained at room temperature for about 12 hours to effect drying and curing of the outer varnish coating. Thereafter, the coated and uncoated insulated conductors were placed in a 200° C. air circulating oven and the effect of this high temperature and air noted at various intervals. The insulated conductor which had not been coated with the varnish darkened badly in less than 48 hours and became almost black. In addition, it showed extreme surface pitting and the insulation had become very weak and "cheesy," and the polyethylene could no longer be cold-drawn. In contrast to this, the sample which was coated with the glyceryl-phthalate varnish, although it had deteriorated somewhat after 500 hours at 200° C., nevertheless, the polyethylene underneath the varnish was still colorless and retained its physical properties as evidenced by the fact that it was tough, flexible and could be readily cold-drawn.

We have found that by incorporating certain specific types of stabilizers in the polyethylene prior to the latter's irradiation with high energy electrons and coating of the irradiated polyethylene with a suitable varnish, still further improvements in resistance to deterioration in air at elevated temperatures are obtained. The following example illustrates this.

EXAMPLE 4

Polyethylene containing two amounts of stabilizer (the stabilizer being N,N'-dinaphthyl-p-phenylene diamine) was sheeted and samples of each were subjected to irradiation with high energy electrons to a dose of $15 \times 10^6$ R. Thereafter, a sample of each stabilized, irradiated polyethylene sheet was dipped, in one instance in the phenolic-modified, rosin-modified, drying oil-modified alkyd varnish containing the two aforesaid driers (identified as "Varnish A") described in Example 1, while the other stabilized and irradiated polyethylene sample was dipped in the rosin and drying oil-modified alkyd varnish (identified as "Varnish B") described in Example 2. Each coated sample was dried at room temperature for about 4 hours. Sample sheets, both coated and uncoated with the varnishes, were placed in an air-circulating oven and maintained at a temperature of 150° C. for varying lengths of time, and periodically examined to determine the effect of the heat-aging. The following Table I shows the results of these heat-aging tests in which table is described the rate of weight loss at failure, and the time at which failure occurred, namely, when the polyethylene became dark, pitted, and began to curl at the edges.

*Table I*

| Weight Percent Stabilizer | Varnish | Time to Failure at 150° C. | Rate of Weight Loss |
|---|---|---|---|
| 0.2% | None | 1,000 hours | 12%/1,000 hrs. |
| 0.5% | None | 2,000 hours | 3%/1,000 hrs. |
| 0.2% | Varnish A | OK after 5,500 hrs | 0.6%/1,000 hrs. (at 5,500 hrs.). |
| 0.5% | Varnish B | OK after 2,800 hrs | 0.15%/1,000 hrs. (at 2,800 hrs.). |

It will be clearly apparent from the above Table I that the stabilizer alone incorporated in the irradiated polyethylene failed to give satisfactory stabilization against continued heating at 150° C. In contrast to this, the irradiated polyethylene samples containing the stabilizer and further coated with a varnish, markedly improved the stability of the irradiated polyethylene so that in one instance after 5500 hours no apparent deterioration had occurred while in another instance after 2800 hours, the sample was apparently unchanged. Note should also be taken of the improvement of the combination of stabilizer (containing 0.5 percent stabilizer) and the overcoating of the varnish whereby the rate of weight loss was only 0.15 percent per 1000 hours, as compared to the weight loss of 0.5 percent per 1000 hours in Example 2 without the stabilizer.

One of the unexpected advantages residing in the use of a cured varnish overcoat superposed upon the irradiated polyethylene is the marked increase in abrasion resistance of such coated irradiated polyethylene surfaces. The following example illustrates this embodiment of our invention.

EXAMPLE 5

Two layers of 0.005" thick polyethylene tape taped around a ⅜" square brass bar were heat-sealed and thereafter irradiated with high energy electrons to a dose level of about $7.5 \times 10^6$ R. Samples of the irradiated polyethylene were dipped twice in a varnish comprising a soya oil-modified alkylated phenol-formaldehyde resin dissolved in a solvent comprising xylene and petroleum spirits to about a 50 percent solids concentration and thereafter dried each time at room temperature for about 4 hours to volatilize the solvent and to cure the resin. An additional sample was prepared by dipping two layers of 0.005" thick glass tape twice in the same modified glyceryl-phthalate resin and dried similarly as above. Samples of the coated and irradiated polyethylene and of the coated glass tape, as well as samples of the irradiated polyethylene which had not been dipped in any varnish, were heat-treated for varying lengths of time. At the end of these heat treatments, the abrasion resistance of each surface was tested employing a 4-pound weight in the Carboloy washer test, more particularly described in an article entitled "Fabric Abrasion Testing" by K. N. Mathes, published in General Electric Review, dated November 1940, volume 43, pages 467–470. The following Table II shows the results of these tests.

*Table II*

| Heating Schedule | Irradiated Polyethylene Samples | | Glass Tape Dipped In Varnish |
|---|---|---|---|
| | No Varnish Treatment | Treated with Two Coats of Varnish | |
| Heated 3 hrs. at 150° C. | 1,560 turns | >20,000 turns | 1,500 turns. |
| Heated 35 days at 150° C. | Flowed and could not be tested. | 3,400 turns | 780 turns. |

Similar results were obtained as above employing a water-soluble phenol-formaldehyde resin which by itself was quite brittle in the cured state. However, when this resin in the form of an alcohol-water solution was applied to the irradiated polyethylene surface and then heated for 35 days at 150° C., it was found that the coated polyethylene was extremely flexible and had good abrasion resistance.

Our invention makes it possible to employ irradiated polyethylene at elevated temperatures in air for long periods of time without apparent deterioration of the polyethylene. The insulated conductors can be used to make windings for motors which can be operated for relatively long periods of time at temperatures up to at least about 155° C. without any apparent harm to the insulation. That such could be accomplished was entirely unexpected and in no way could have been predicted because of the fact that heretofore, although irradiation did effect cross-linking of polyethylene, unfortunately at higher temperatures the oxidative effects of the air caused undesirable premature deterioration of the irradiated polyethylene. In making motors, instead of using insulated conductors insulated with irradiated polyethylene which in turn have been coated with the above-mentioned protective varnishes, the insulated conductor may be formed into the core or winding of the motor, and the entire assembly dipped in the varnish, and thereafter baked to effect curing of the resinous coating on the irradiated polyethylene insulation.

As a further means of practicing the present invention, sheets composed of irradiated polyethylene may be coated on one side with the varnish and thereafter slit into the form of tapes, which can then be used for insulating or protective purposes. Our invention is also eminently suitable in the packaging of various objects employing for the container irradiated polyethylene. By treating the irradiated polyethylene film, either before or after it is placed around the object which it is desired to confine, the irradiated polyethylene can be subjected to elevated temperatures without deterioration of the latter due to the effects of the oxygen in the air. By evacuation of the area confined by the polyethylene, one can obtain sealed objects which can be maintained at elevated temperatures, for instance, for sterilization purposes, without deterioration of the polyethylene film, either on the exterior coated side or the interior uncoated side.

What we claim as new and desire to secure by Letters Patent of the United States is:

1. Electron-irradiated polyethylene dosed in air with from about $2 \times 10^6$ R. to $20 \times 10^6$ R. coated with a uniform, continuous, protective, resinous coating which is firmly adhered to the irradiated polyethylene surface.

2. Electron-irradiated polyethylene dosed in air with from about $2 \times 10^6$ R. to $20 \times 10^6$ R. coated with a protective modified resinous polyhydric alcohol polycarboxylic acid reaction product which is in the form of a uniform, continuous, protective coating firmly adhered to the irradiated polyethylene surface.

3. Electron-irradiated polyethylene dosed in air with from about $2 \times 10^6$ R. to $20 \times 10^6$ R. coated with an oil- and phenolic-resin-modified glyceryl-phthalate resin which is in the form of a uniform, continuous, protective coating firmly adhered to the irradiated polyethylene surface.

4. Electron-irradiated polyethylene dosed in air with from about $2 \times 10^6$ R. to $20 \times 10^6$ R. coated with a rosin-modified glyceryl-phthalate resin which is in the form of a uniform, continuous, protective coating firmly adhered to the irradiated polyethylene surface.

5. Electron-irradiated polyethylene dosed in air with from about $2 \times 10^6$ R. to $20 \times 10^6$ R. coated with a composition comprising a modified phenol-formaldehyde resin which is in the form of a uniform, continuous, protective coating firmly adhered to the irradiated polyethylene surface.

6. An insulated conductor composed of a metallic core, insulation comprising electron-irradiated polyethylene dosed in air with from about $2 \times 10^6$ R. to $20 \times 10^6$ R. and an outer coating superposed upon the irradiated polyethylene comprising a resinous uniform, continuous, protective coating firmly adhered to the irradiated polyethylene surface.

7. An insulated conductor composed of a copper core, insulation comprising electron-irradiated polyethylene dosed in air with from about $2 \times 10^6$ R. to $20 \times 10^6$ R., and an outer resinous coating comprising a modified resinous reaction product of a polyhydric alcohol and a polycarboxylic acid, said resinous coating being in the form of a uniform, continuous, protective coating firmly adhered to the irradiated polyethylene surface.

8. An insulated conductor composed of a copper core, insulation for the latter comprising electron-irradiated polyethylene dosed in air with from about $2 \times 10^6$ R. to $20 \times 10^6$ R., and an outer uniform, continuous, protective coating superposed on and firmly adherent to the irradiated polyethylene insulation comprising a glyceryl-phthalate resin modified with a phenol-aldehyde condensation product.

9. An electrical winding comprising a plurality of insulated conductors composed of a metallic core, insulation for the latter comprising electron-irradiated polyethylene dosed in air with from about $2 \times 10^6$ F. to $20 \times 10^6$ R., and an outer coating on the irradiated polyethylene comprising a uniform, continuous, protective resinous coating firmly adhered to the irradiated polyethylene surface.

10. A slot liner comprising electron-irradiated polyethylene dosed in air with from about $2 \times 10^6$ R. to $20 \times 10^6$ R. coated with a uniform, continuous, protective, resinous coating firmly adherent to the irradiated polyethylene surface.

11. The method of preventing undesirable deterioration of polyethylene dosed in air with from about $2 \times 10^6$ R. to $20 \times 10^6$ R. subjected to temperatures up to about 155° C. or higher for long periods of time, which comprises coating the aforesaid irradiated polyethylene with a resinous composition which is in the form of a uniform, continuous, protective coating firmly adherent to the irradiated polyethylene surface.

12. The process for preventing deterioration of polyethylene, electron-irradiated with a dosage of about $2 \times 10^6$ R. to $20 \times 10^6$ R., when exposed to air at temperatures up to 155° C. or higher for long periods of time which comprises coating the irradiated polyethylene with a modified resinous composition comprising a reaction product of a polyhydric alcohol and a polycarboxylic acid, the aforesaid resinous coating being in the form of a continuous, uniform, protective coating firmly adherent to the irradiated polyethylene.

13. The process for preventing deterioration of polyethylene, electron-irradiated with a dosage of about $2 \times 10^6$ R. to $20 \times 10^6$ R., when exposed to air at temperatures up to 155° C. or higher for long periods of time which comprises coating the irradiated polyethylene with a glyceryl-phthalate resin modified with a phenol-aldehyde condensation product, the aforesaid resinous coating being in the form of a uniform, continuous, protective coating firmly adherent to the irradiated polyethylene surface.

14. The process for preventing deterioration of polyethylene, electron-irradiated with a dosage of about about $2 \times 10^6$ R. to $20 \times 10^6$ R., when exposed to air at temperatures up to 155° C. or higher for long periods of time which comprises coating the irradiated polyethylene with a phenol-formaldehyde condensation product, the latter condensation product being in the form of a uniform, continuous, protective coating firmly adherent to the polyethylene surface.

15. The method for improving the heat aging characteristics of conductors insulated with polyethylene dosed in air with from about $2 \times 10^6$ R. to $20 \times 10^6$ R. temperatures up to 155° C. or higher, which comprises coating the insulated conductor with a resinous coating selected from the class consisting of (a) rosin-modified reaction products of a polyhydric alcohol and a polycarboxylic acid, (b) a reaction product of a polyhydric alcohol and a polycarboxylic acid modified with a phenol-aldehyde condensation product and (c) phenol-aldehyde condensation products, the aforesaid resinous coating being in the form of a uniform, continuous, protective coating firmly adherent to the polyethylene surface.

References Cited in the file of this patent

UNITED STATES PATENTS

| | | |
|---|---|---|
| 2,336,219 | Brown | Dec. 7, 1943 |
| 2,400,892 | Soday | May 28, 1946 |
| 2,462,977 | Kitchin et al. | Mar. 1, 1949 |
| 2,586,587 | Wendt | Feb. 19, 1952 |
| 2,648,097 | Kritchever | Aug. 11, 1953 |
| 2,672,427 | Bauling | Mar. 16, 1954 |

FOREIGN PATENTS

| | | |
|---|---|---|
| 510,068 | Belgium | Apr. 15, 1952 |
| 1,058,934 | France | Nov. 10, 1953 |

OTHER REFERENCES

Little: Nature, vol. 170, #4338, December 20, 1952, pp. 1075, 1076.

Modern Plastics, vol. 31, #8, April 1954, pp. 100, 101, 219.

Sisman et al.: Physical Properties of Irradiated Plastics, Oak Ridge National Laboratories, ORNL–928, June 29, 1951, pp. 8–26, 78–82.